United States Patent [19]

Perilloux

[11] E Patent Number: Re. 33,729

[45] Reissued Date of Patent: Oct. 29, 1991

[54] MULTILAYER OPTICAL FILTER FOR PRODUCING COLORED REFLECTED LIGHT AND NEUTRAL TRANSMISSION

[75] Inventor: Bruce E. Perilloux, Grass Valley, Calif.

[73] Assignee: Coherent, Inc., Auburn, Calif.

[21] Appl. No.: 558,597

[22] Filed: Jul. 27, 1990

Related U.S. Patent Documents

Reissue of:

[64] Patent No.: 4,793,669
Issued: Dec. 27, 1988
Appl. No.: 96,135
Filed: Sep. 11, 1987

[51] Int. Cl.[5] ..... G02B 5/22; G02B 5/28

[52] U.S. Cl. ..... 359/359; 359/589

[58] Field of Search ..... 350/1.6, 166

[56] References Cited

U.S. PATENT DOCUMENTS

| | | | |
|---|---|---|---|
| 3,279,317 | 10/1966 | Ploke | 350/1.6 |
| 3,990,784 | 11/1976 | Gelber | 350/166 |
| 4,045,125 | 8/1977 | Farges | 350/166 |
| 4,047,805 | 9/1977 | Sekimura | 350/166 |
| 4,229,066 | 10/1980 | Rancourt et al. | 350/1.6 |
| 4,536,063 | 8/1985 | Southwell | 350/164 |
| 4,793,669 | 12/1988 | Perilloux | 350/1.6 |

*Primary Examiner*—Bruce Y. Arnold
*Assistant Examiner*—J. P. Ryan
*Attorney, Agent, or Firm*—Limbach, Limbach & Sutton

[57] ABSTRACT

A short-wave-pass optical filter, that includes a partially absorbing or transparent substrate coated by a set of layers having specified quarter-wave optical thickness, and is designed to reflect visible radiation of a selected color while transmitting visible radiation and maintaining a neutral color balance. The coating includes layers having a high refractive index alternating with layers having a low refractive index. The refractive indices and layer thicknesses are selected so that the filter's reflectance spectrum exhibits a ripple over a first segment of the visible spectrum but no significant ripple over a second segment of the visible. The filters may be used as sunglass lenses that have a selected color (such as blue, orange, or violet) when viewed by one other than the sunglass wearer, while permitting the wearer to perceive transmitted light with a correct color balance. The design of the inventive filter is preferably optimized to have the desired optical properties while being conveniently and repeatably manufacturable.

32 Claims, 5 Drawing Sheets

MULTILAYER OPTICAL FILTER FOR PRODUCING COLORED REFLECTED LIGHT AND NEUTRAL TRANSMISSION

Matter enclosed in heavy brackets [ ] appears in the original patent but forms no part of this reissue specification; matter printed in italics indicates the additions made by reissue.

*This is a reissue of Ser. No. 07/096,135 filed 09/11/87, which issued as U.S. Pat. No. 4,793,669.*

FIELD OF THE INVENTION

This invention relates to short-wave-pass optical filter coatings. More particularly, the invention relates to short-wave-pass optical fibers that reflect light in one or more selected wavelength segments of the visible spectrum, but transmit visible wavelengths with neutral color balance.

BACKGROUND OF THE INVENTION

Although the discussion in this specification applies to all optical filters (including any lens, mirror, and any other optical filter), such discussion will sometimes include specific references to the lenses of sunglasses for simplicity. Sunglass lenses are an important embodiment of the inventive optical filter, though by no means is such embodiment the only one contemplated by the inventor.

The common gray, green or brown tinted sunglass is usually a colored glass that absorbs a significant amount of radiation in both the visible and ultra-violet spectra. It is very difficult to create a tinted glass that has near neutral visible radiation transmission qualities and also absorbs ultra-violet or infrared radiation (or both ultra-violet and infrared radiation).

It is well known that clear glass (e.g. BK-7) will transmit the entire visible spectrum, and that a coating may be applied to clear glass in order to reflect certain wavelengths of light. Any wavelength which is completely reflected from such coated glass will not be transmitted. Therefore, these wavelengths will be taken out of the color spectrum when viewing natural objects through the glass.

It is also known that two quarter-wave stacks, where all layers comprising each stack have the same quarter-wave optical thickness, deposited upon a transparent substrate, may be used as a short-wave-pass (SWP) filter. It is conventional to adjust the optical thickness of each stack so that the visible wavelengths (400 nm to 680 nm) will not reflect and the near-infrared (NIR) wavelengths (700 nm to 1100 nm) will totally reflect from the coated substrate. It is also known that a substrate (commonly glass) that absorbs a percentage of the visible wavelengths and all ultra-violet radiation may be employed as a sunglass, and could be coated by a quarter-wave stack of the above-described type. This sunglass will absorb all UV solar radiation and reflect all NIR solar radiation and will allow only a percentage of the total visible spectrum to pass through to the eye.

It is conventional that the double quarter-wave stack may have more than 25 layers whose thickness is optimized so that a very small part of one (or both) of the colors blue and red (on the edges of the visible spectrum) are reflected for aesthetic purposes. Revo ® sunglasses (commercially available through Coopervision, Inc.) are an example of eyeglasses having such a multilayer coating. By reflecting only a small amount of the visible radiation, and only reflecting visible radiation in the wavelength regions where the human eye is least sensitive (in the blue and red), a relatively correct color balance is maintained in transmission. This color balance and the observed reflected aesthetic color can be computed numerically and plotted on a chromaticity chart. Since the glass conventionally used absorbs more blue than red and yellow light, the transmitted color balance tends to be slightly yellow.

If the described multilayer coating were scratched, a visual defect would be observed due to the multilayer interference. However, a thick top layer of fused silica is conventionally used to make most scratches unobservable.

Although such conventional lenses are designed to have desirable optical properties, that are very difficult and expensive to manufacture. Specifically, the design of the prior art lenses require that the coatings must be applied with great accuracy. However, deviations in the manufacturing process commonly cause the reflected wavelengths to vary. If the variation is such that the reflected range is out of the visible region (a common occurrence), the lens will not be properly colored in reflection. If the shift moves the reflected range further into the visible region (another common occurrence), too much visible radiation will be reflected and the transmitted color balance will be lost. This latter result is particularly a problem if red light is reflected so that the wearer might not be able to detect a red traffic light.

Also, since the substrate of this type of prior art lens has a curved surface, a green ring is typically observable (when reflecting red light) near the edge of the lens because the coating's spectral curve shifts toward shorter wavelengths with increasing incidence angle.

More simplistic coating designs are utilized on other commercially available sunglasses. These simple designs typically use a basic five to ten layer broad band anti-reflection coating (AR). These coatings reflect some part of the visible spectrum for aesthetic purposes. However, they do not simultaneously preserve neutral transmitted color balance and block substantially all infrared light. If one were to integrate to find the area under the reflectance spectrum of one of these filters (over the visible wavelength band) the total area would be more than one would obtain if one performed similar integration of a reflectance curve characterizing the inventive filter. The quality of the color balance is accordingly degraded in the conventional coating design. Although the manufacturing complexity of this simple conventional coating design, and the cost to manufacture filters embodying such design, is relatively low, the optical performance of filters embodying such simple coating design is compromised.

It has not been known until the present invention how optical filters (used as sunglasses) having a selected aesthetic reflected color and a neutral transmitted color balance may be repeatedly and economically produced.

SUMMARY OF THE INVENTION

The inventive optical filter is a short-wave-pass (SWP) filter deposited upon a substrate where the multilayer coating is designed to reflect near-infrared wavelengths, and to partially reflect a desired color in the visible spectrum while also maintaining neutral transmitted color. In a preferred embodiment, the substrate is composed of UV-absorbing glass, and the coating is a double quarter-wave stack of alternating layers of $SiO_2$ and $TiO_2$, Ti or $Ti_2O_3$. Preferably the thickness of each layer is optimized (each layer thickness may be different) using a merit function to produce the desired optical properties in a manufacturable and reproducible design.

The reflectance of the inventive filter (as a function of wavelength) is designed to have a ripple in at least one segment of the visible spectrum, but to have no significant ripples in all other segments of the visible spectrum. The partial reflection represented by the one or more rippled regions is sufficient to give the filter a desired aesthetic color, such as violet, orange, or blue. Since not all the light in each rippled segment is reflected, the transmitted light will have a natural color balance, so that an observer viewing the transmitted light will perceive true realworld colors.

The inventive filter has its high-reflectance region centered further into the NIR portion of the spectrum (away from the visible spectrum) than in prior art sunglasses since the stopband is not used to generate an aesthetic reflected color. As a result, there is no green ring observed near the edge of the filter in transmission (especially when reflecting red light).

DETAILED DESCRIPTION OF THE PREFERRED EMBODIMENT

Figure 1:
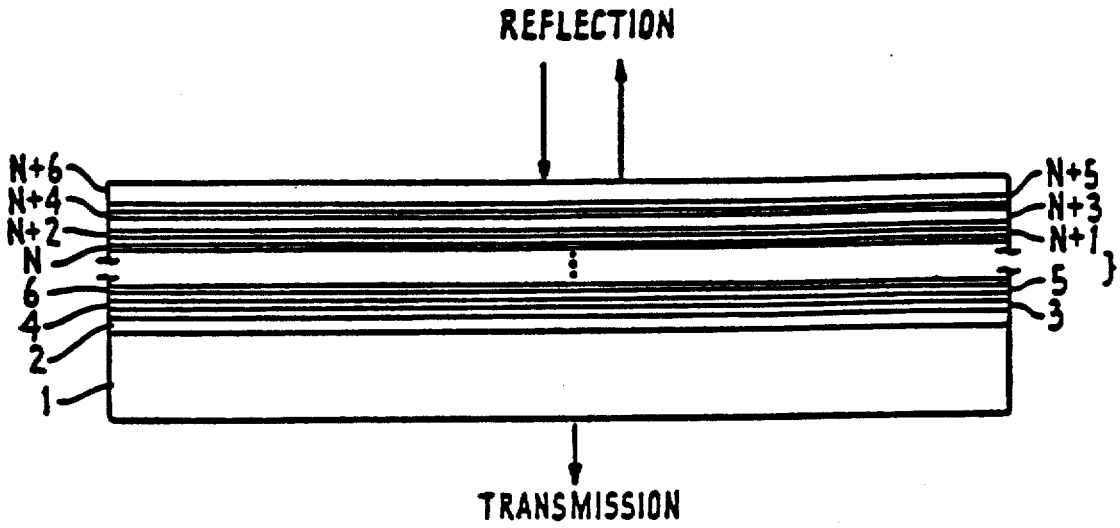
FIG. 1 is a cross-sectional view of an optical filter of the type that may embody the invention. Substrate 1 supports N+5 coating layers (identified by numerals 2,3, . . . , N+6).

FIG. 1 is an enlarged cross-sectional view of an SWP filter of the type that may embody the invention. Substrate 1 is preferably an optical filter glass, preferably of the type that absorbs UV radiation (radiation having wavelength less than 400 nm) and transmits approx. 25% of all visible light. UV-absorbing glass of any conventional type is suitable for use as substrate 1 in many applications, such as applications in which the filter is used as a sunglass lens. In particular, TAN-C Crown Glass (manufactured by Schott Glass Technologies, Inc.) is a preferred UV-absorbing glass.

It should be appreciated, however, that the substrate on which the inventive coating is applied need not be absorptive of UV and partially absorptive of visible light. Alternatively, it could be transparent to either UV, or visible light, or to both. Also, where it is desired to use an absorptive substrate, a single thin-film layer of absorbing material may be coated on transparent glass to achieve the desired optical properties of the substrate.

A number of quarter-wave layers (having reference numerals 2 through N+6) are successively coated on the surface of substrate, so that layers formed of material having low reflective index alternate with layers formed of material having high refractive index. The number of quarter-wave layers coated on the substrate will depend on the desired optical properties of the filter. The invention in its broadest scope is not limited to a class of filters having any specific number of layers. There may be an even number or odd number of layers. The layer immediately adjacent the substrate (layer 2 in FIG. 1) may be a member of the subset having high refractive index or may be a member of the subset having low refractive index. In one illustrative embodiment of the invention substrate 1 is glass having index of refraction equal to 1.52, the even layers (2, 4, 6 and so on) are composed of silicon dioxide (having index of refraction 1.47) and the odd layers (3, 5, 7 and so on) are composed of titanium dioxide (having index of refraction 2.25). Alternatively, the even-numbered coatings may be composed of titanium dioxide (having refractive index of 2.25) and the odd-numbered coatings may be composed of silicon dioxide (having refractive index of 1.47). It should be noted that other oxide compounds could be substituted for these materials (i.e., TiO or $Ti_2O_3$ may be substituted for $TiO_2$).

The layers in each subset need not all have identical refractive index, or optical thickness equal to one quarter wavelength of some selected electromagnetic wave. The refractive index and thickness of each layer is selected in a manner to be described below so that the filter has a reflectance spectrum exhibiting a ripple over a first segment of the visible spectrum (the terms "segment" and "region" will be used interchangeably herein to denote any continuous wavelength range of the spectrum spanned by two distinct wavelengths, or several of such ranges). However, the inventive filter's reflectance spectrum exhibits no significant ripple over a second segment of the visible spectrum. Throughout this specification, including the claims, the term "ripple" (or "rippled region", or the like) will be used to describe a portion of a reflectance spectrum (such as the spectrum of FIG. 2, 3, or 4) characterizing the inventive filter. This term denotes a spectrum portion that includes peaks and troughs with sufficiently large peaks (a large peak represents a large reflectance) so that an observer of reflected light from the filter having wavelength within the rippled region will observe a desired reflected color, but an observer of visible light transmitted from a real-world object through the filter will perceive true real-world colors. Thus, transmitted light having wavelengths in the non-rippled portion of the visible range, together with transmitted light having wavelengths corresponding to the rippled region, will be perceived as having a neutral color balance. Regions in the visible reflectance spectrum that include ripples of sufficiently low amplitude do not contribute significantly to producing a desired aesthetic color to an observer viewing the filter. These regions will not be referred to as exhibiting a "significant ripple" or "a ripple" (or the like), and instead will be denoted as "non-rippled" regions (or the like).

Figure 2:
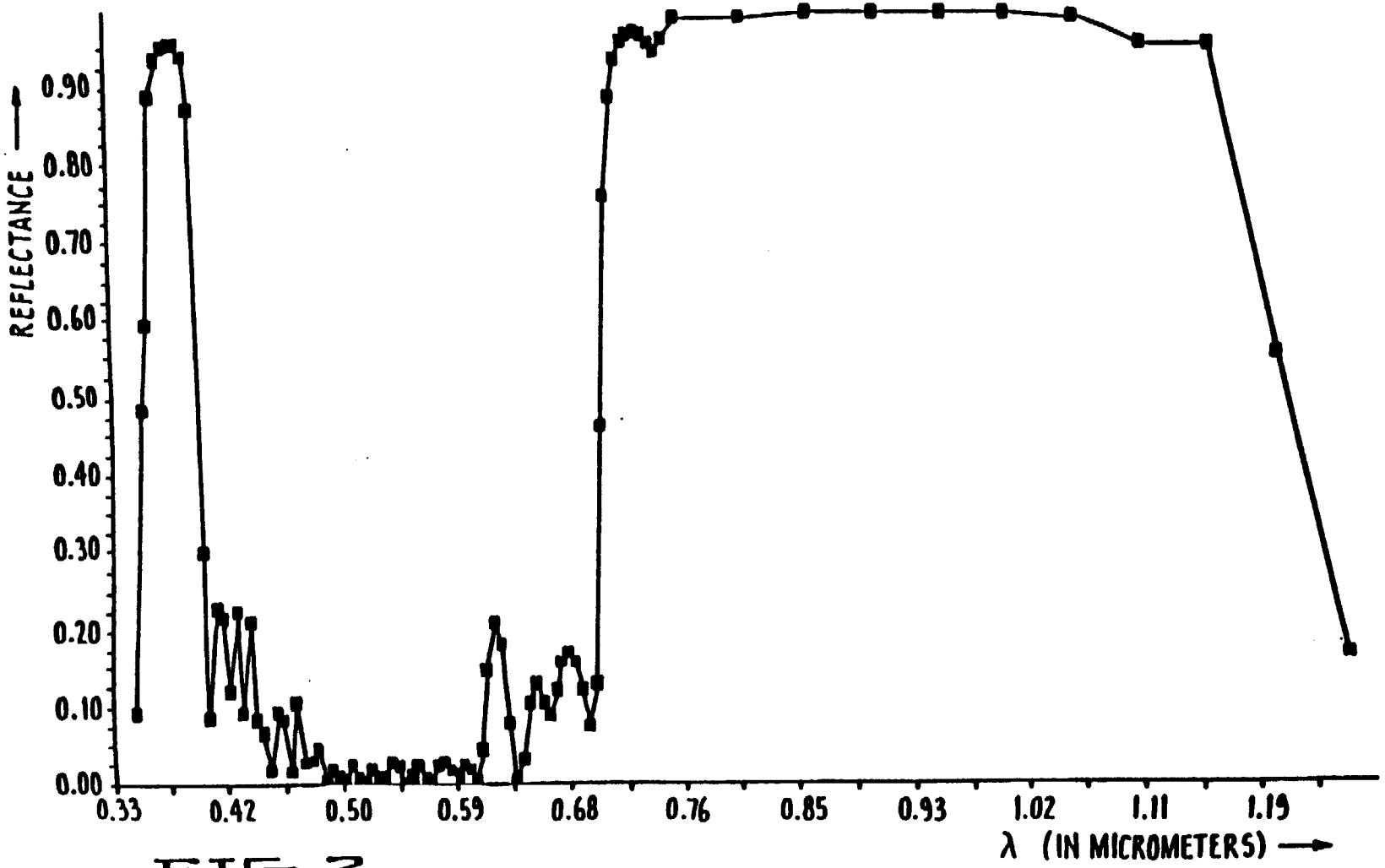
FIG. 2 is a graph showing the reflectance characteristics of a preferred embodiment of the inventive filter that reflects light having a violet appearance. Distance above the horizontal axis represents reflectance. Horizontal distance away from the vertical axis represents wavelength in units of micrometers.

The general optical properties of the inventive filter may be readily understood with reference to the preferred embodiment characterized by FIG. 2. FIG. 2 is the reflectance curve characterizing an inventive filter which reflects light having a violet appearance. This filter reflects substantially all (i.e. more than approximately 93 percent) near-infrared electromagnetic radiation in the segment of the spectrum from about 700 nanometers to about 1100 nanometers. The filter also reflects substantially no light in the segment of the visible spectrum from about 490 nm to about 600 nm. The reflectance curve exhibits no significant rippling in this 490 nm–600 nm range. The reflectance curve does exhibit a ripple in each of two segments of the visible spectrum: the violet segment from about 400 nm to about 460 nm; and the red segment from about 600 nm to about 670 nm. Sunlight (or other light having components spanning the visible range) reflected from the FIG. 2 filter will thus have a violet appearance (being a mixture of red an violet light). More importantly a viewer observing light transmitted through the FIG. 2 filter will perceive true real-world colors. This favorable neutral transmitted color balance results because the human eye does receive components of visible light (through the inventive filter) spanning almost the entire visible spectrum (i.e., components having wavelengths in the rippled region as well as those having wavelengths in the non-rippled region). The average reflection over the wavelength range in the rippled regions is less than the peak reflectance values in the rippled regions. This helps to preserve neutral color transmission.

Figure 5:
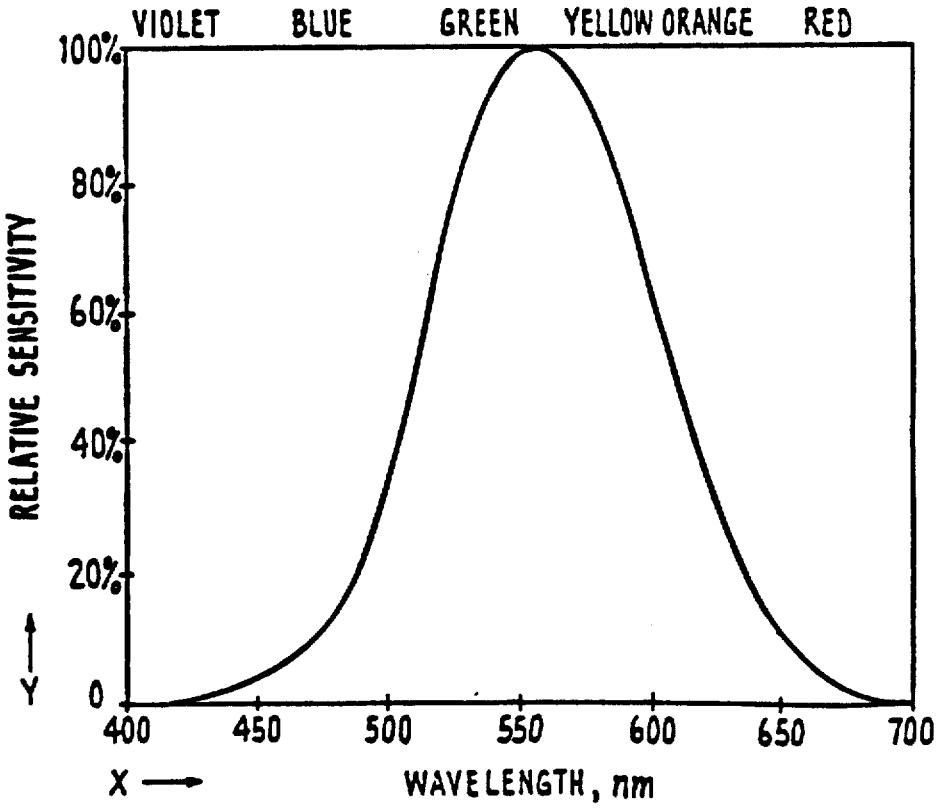
FIG. 5 is a graph of the human eye's relative sensitivity to light versus the wavelength of the light. Increasing distance above the horizontal axis represents increasing relative sensitivity. Increasing distance away from the vertical axis represents increasing wavelength, in units of nanometers.

The perceived high quality color balance of the FIG. 2 filter is enhanced by the insensitivity of the human eye to colors in the violet (400–460 nm) range and red (600–670 nm) range relative to colors in the green and yellow ranges (525 nm–575 nm), as is apparent from FIG. 5. In fact, as is also apparent from FIG. 5, if an optical filter blocks as much as 50 percent of light in the 400–460 nm range (for example), there will be only a minimal effect in color balance perceived by a human observer. However, the FIG. 2 filter does not block all light in (for example) the 400–460 nm range, but instead is tailored selectively to partially reflect only certain wavelengths in such range.

The FIG. 2 filter includes a glass substrate having refractive index of approximately 1.52, and extinction coefficients (as a function of wavelength) shown in Table 1:

TABLE I

| Wavelength (nanometers) | Extinction Coefficient |
|---|---|
| 360 | 1.0E-6 |
| 400 | .0225 |
| 440 | .03 |
| 480 | .061 |
| 520 | .100 |
| 560 | .167 |
| 600 | .206 |
| 640 | .225 |
| 680 | .241 |
| 700 | .24 |
| 740 | .188 |
| 780 | .136 |

The extinction coefficients are indicative of the amount of absorption in the substrate as a function of wavelength.

Thirty alternating layers of $SiO_2$ (having refractive index substantially equal to 1.47 and $TiO_2$ (having refractive index substantially equal to 2.25) are supported by the substrate's surface. The physical thickness and refractive index of each layer is listed in Table 2:

TABLE 2

| LAYER | REFRACTIVE INDEX | PHYSICAL THICKNESS (MICROMETERS) |
|---|---|---|
| 1 | 2.25 | .1058 |
| 2 | 1.47 | .1597 |
| 3 | 2.25 | .0929 |
| 4 | 1.47 | .1531 |
| 5 | 2.25 | .0844 |
| 6 | 1.47 | .1496 |
| 7 | 2.25 | .0794 |
| 8 | 1.47 | .1480 |
| 9 | 2.25 | .0847 |
| 10 | 1.47 | .1505 |
| 11 | 2.25 | .0858 |
| 12 | 1.47 | .1493 |
| 13 | 2.25 | .0823 |
| 14 | 1.47 | .1475 |
| 15 | 2.25 | .0882 |
| 16 | 1.47 | .1669 |
| 17 | 2.25 | .1135 |
| 18 | 1.47 | .1898 |
| 19 | 2.25 | .1121 |
| 20 | 1.47 | .1827 |
| 21 | 2.25 | .1178 |
| 22 | 1.47 | .1914 |
| 23 | 2.25 | .1120 |
| 24 | 1.47 | .1806 |
| 25 | 2.25 | .1128 |
| 26 | 1.47 | .1856 |
| 27 | 2.25 | .1162 |
| 28 | 1.47 | .1788 |
| 29 | 2.25 | .1039 |
| 30 | 1.47 | .2638 |

The layer immediately adjacent the substrate is identified as layer number 1, and the layer farthest from the substrate is identified as layer number 30. Layer 30 intentionally much thicker than the other $SiO_2$ layers, so that it will be scratch insensitive, in the sense that minor scratches in layer 30 will not be apparent to a viewer of reflected or transmitted light. The thirty layers comprise a double quarter-wave coating stack.

The design of FIG. 2 filter (and the other preferred embodiments of the invention) is preferably determined using an iterative optimization technique given the following constraints: the optical constants of the substrate and film materials are known; the desired reflectance spectrum is specified; then each layer thickness is found. To insure the filter is conveniently and repeatably manufactured, each layer's thickness must be within a specified tolerance of the optimum thickness. Therefore any small variations in each layer's thickness will not significantly alter the filter's reflectance curve. Preferably, the layer farthest from the substrate should be sufficiently thick so as to be scratch insensitive (in the sense defined above). Those of ordinary skill in the art will be familiar with, and capable of performing such an iterative optimization operation, as a matter of routine design. The operation will typically included the steps of choosing a merit function, and then minimizing the merit function, to determine the optimal set of design parameters. For example, U.S. Pat. No. 4,536,063, issued Aug. 20, 1985 to Southwell, (which patent is incorporated herein by reference), discusses the manner in which an optical coating design merit function may be chosen, and then minimized, to generate a desired optical coating design.

Another preferred embodiment of the invention will next be described with reference to FIG. 3. The FIG. 3 embodiment is an SWP filter designed to reflect light having an orange appearance. This filter is characterized by the reflectance curve shown in FIG. 3. The FIG. 3 filter reflects substantially all NIR radiation, and transmits substantially all visible radiation in the 400 nm–590 nm band. Although the reflectance in the 400–590 nm band is not perfectly flat (near zero), it exhibits no rippling of significant amplitude. The FIG. 3 curve does exhibit a ripple in the yellow and red wavelength regions (590 nm–620 nm and 620 nm–670 nm respectively). Thus, light reflected from the filter will be a combination of red and yellow components and will have an orange appearance. The FIG. 3 filter is designed so that the transmitted color balance will be neutral (as was the FIG. 2 embodiment). Note that the amplitude of the ripple is greater in the red region (620–670 nm) than in the yellow region. This is feasible, given the constraint that the filter transmit a neutral color balance, since the human eye is less sensitive to red light than yellow light (see FIG. 5). Thus, the eye is less sensitive to reduced red wavelengths (or red wavelengths having very low amplitude) than to reduced yellow wavelengths (or yellow wavelengths having very low amplitude).

Since the stopband (i.e., the NIR band reflected by the inventive SWP filter) is not used to generate an aesthetic reflected color, the inventive filter has its highly reflective part centered farther into the NIR band (at a wavelength longer than any visible wavelength) than do conventional sunglass lenses. Thus, the inventive filter desirably lacks an observable green ring near its edge (in transmission) when employed as a sunglass lens.

Figure 3:
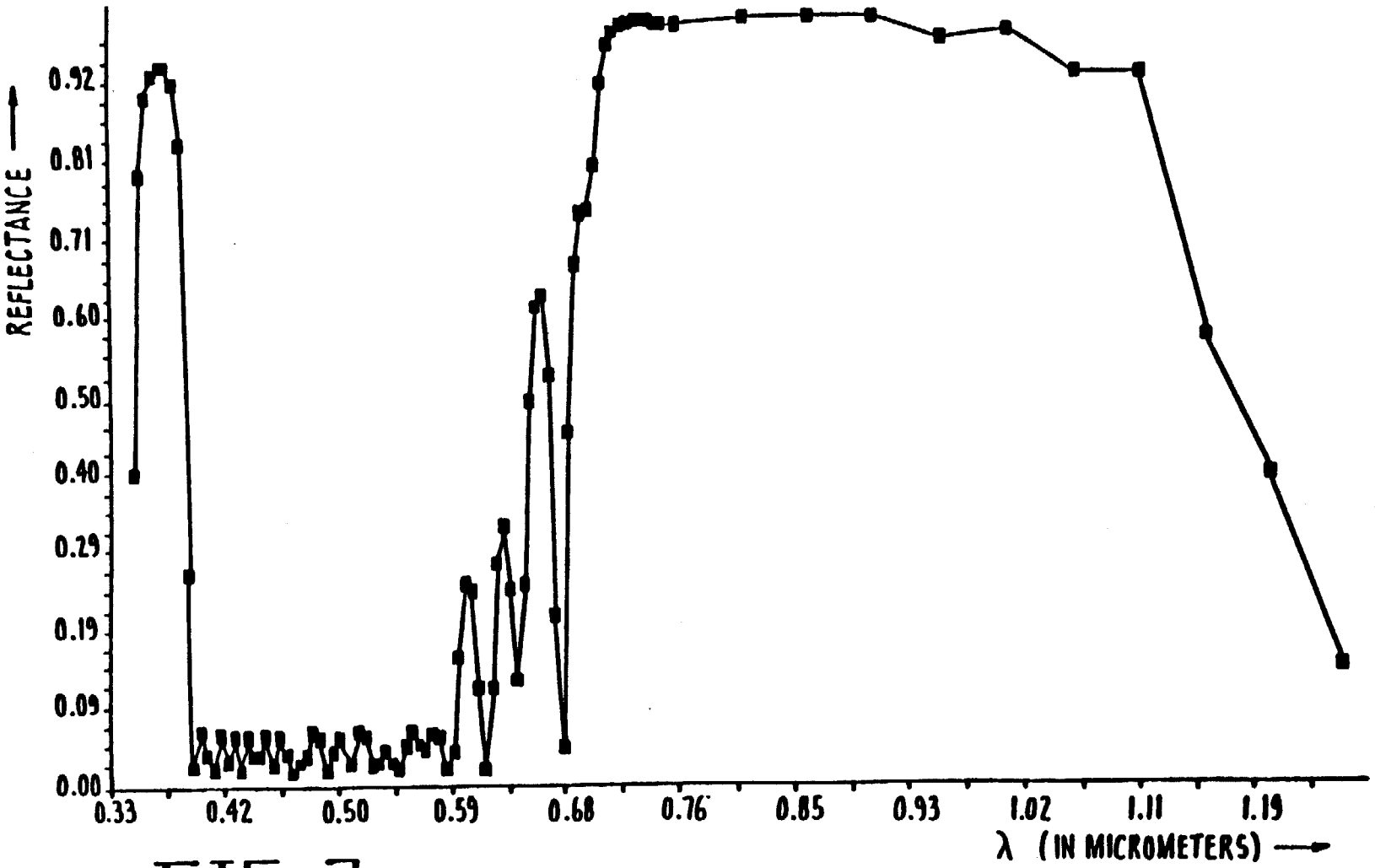
FIG. 3 is a graph (having the same axes as FIG. 2) showing the reflectance characteristics of a preferred embodiment of the inventive filter that reflects light having an orange appearance.

The FIG. 3 filter includes a glass substrate (with refractive index 1.52 and extinction coefficients as listed in Table 1) and twenty-nine alternating layers of $SiO_2$ (with refractive index 1.47) and $TiO_2$ (with refractive index 2.25) supported by the substrate's surface. The physical thickness and refractive index of each layer is listed in Table 3:

TABLE 3

| Layer Number | Refractive Index | Physical Thickness (micrometers) |
|---|---|---|
| 1 | 1.47 | .0122 |
| 2 | 2.25 | .0922 |
| 3 | 1.47 | .1440 |
| 4 | 2.25 | .0778 |
| 5 | 1.47 | .1395 |
| 6 | 2.25 | .0823 |
| 7 | 1.47 | .1461 |
| 8 | 2.25 | .0859 |
| 9 | 1.47 | .1431 |
| 10 | 2.25 | .0861 |
| 11 | 1.47 | .1425 |
| 12 | 2.25 | .0862 |
| 13 | 1.47 | .1444 |
| 14 | 2.25 | .0834 |
| 15 | 1.47 | .1454 |
| 16 | 2.25 | .0827 |
| 17 | 1.47 | .1585 |
| 18 | 2.25 | .1055 |
| 19 | 1.47 | .1792 |
| 20 | 2.25 | .1074 |
| 21 | 1.47 | .1798 |
| 22 | 2.25 | .1102 |
| 23 | 1.47 | .1790 |
| 24 | 2.25 | .1111 |
| 25 | 1.47 | .1770 |

TABLE 3-continued

| Layer Number | Refractive Index | Physical Thickness (micrometers) |
|---|---|---|
| 26 | 2.25 | .1102 |
| 27 | 1.47 | .1782 |
| 28 | 2.25 | .1026 |
| 29 | 1.47 | .2427 |

The layers are numbered in order of increasing distance from the substrate, so that layer number 1 is the layer immediately adjacent to the substrate and layer number 29 is the outermost, scratch insensitive layer.

Figure 4:
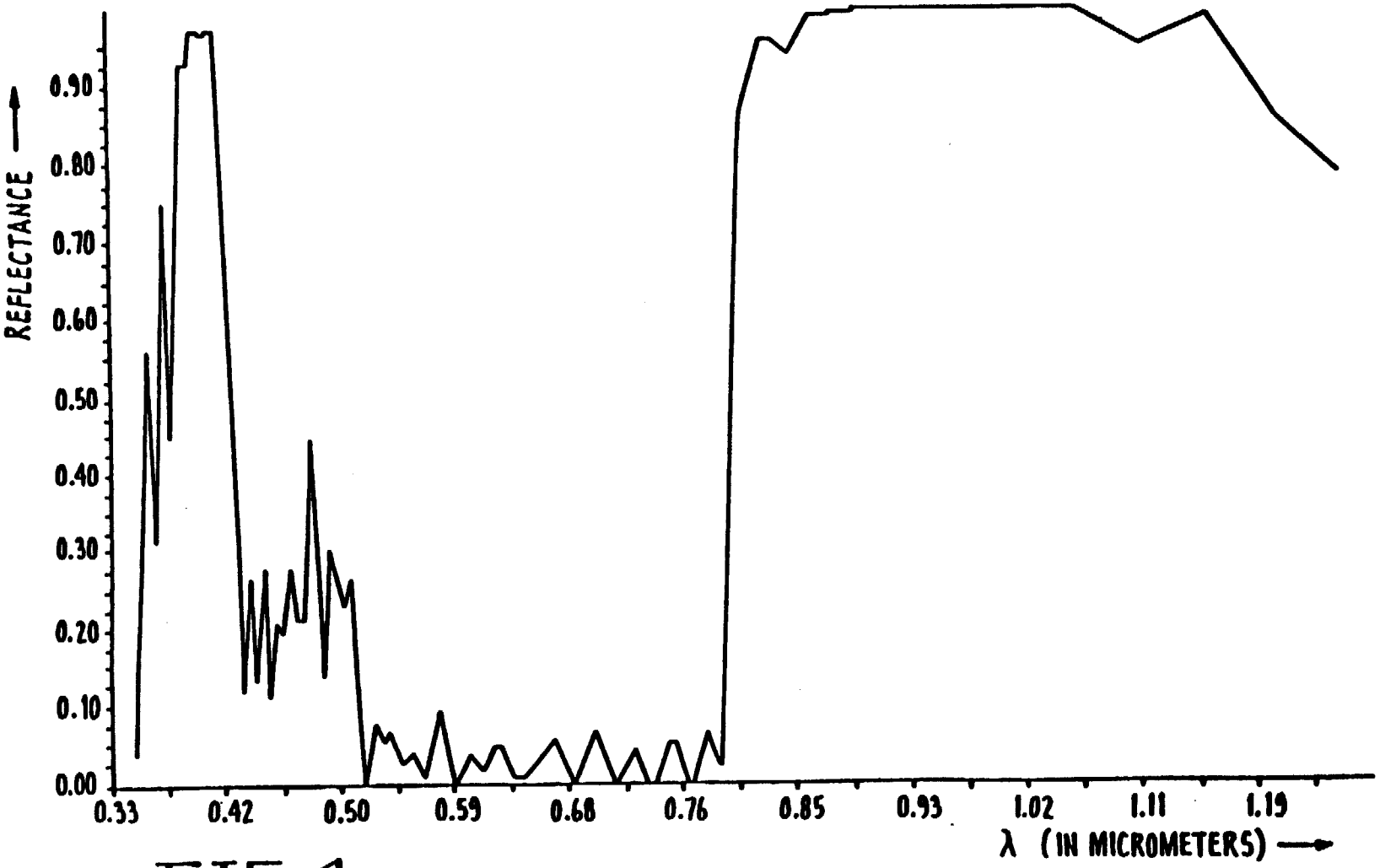
FIG. 4 is a graph (having the same axes as FIG. 2) showing the reflectance characteristics of a preferred embodiment of the inventive filter that reflects light having a blue appearance.

A third preferred embodiment of the inventive SWP filter, designed to reflect blue light, will next be described with reference to FIG. 4. FIG. 4 shows that this "blue" embodiment of the invention reflects substantially all NIR radiation above wavelength 790 nm, and transmits substantially all light in the range from 505 nm to 700 nm. There is no ripple of significant amplitude in such 505–700 nm range. The reflectance curve does exhibit a ripple in the blue region from about 450 nm to about 505 mm. Like the FIG. 2 and FIG. 3 filters, the FIG. 4 filter is designed so that its transmitted color balance is neutral. The eye of a viewer observing light transmitted through the FIG. 4 filter will not be very sensitive to the reflected components having low amplitude (the wavelength components corresponding to the ripple).

The FIG. 4 filter includes a glass substrate (with refractive index 1.52 and extinction coefficients as listed in Table 1) and twenty-nine alternating layers of $SiO_2$ (with refractive index 1.47), and $TiO_2$ (with refractive index 2.25) supported by the substrates surface. The physical thickness and refractive index of each layer is listed in Table 4:

TABLE 4

| Layer Number | Refractive Index | Physical Thickness (micrometers) |
|---|---|---|
| 1 | 1.47 | .0122 |
| 2 | 2.25 | .1134 |
| 3 | 1.47 | .1757 |
| 4 | 2.25 | .1089 |
| 5 | 1.47 | .1531 |
| 6 | 2.25 | .1047 |
| 7 | 1.47 | .1623 |
| 8 | 2.25 | .1024 |
| 9 | 1.47 | .1590 |
| 10 | 2.25 | .1044 |
| 11 | 1.47 | .1545 |
| 12 | 2.25 | .1073 |
| 13 | 1.47 | .1544 |
| 14 | 2.25 | .1086 |
| 15 | 1.47 | .1590 |
| 16 | 2.25 | .1103 |
| 17 | 1.47 | .1691 |
| 18 | 2.25 | .1210 |
| 19 | 1.47 | .1899 |
| 20 | 2.25 | .1249 |
| 21 | 1.47 | .2018 |
| 22 | 2.25 | .1177 |
| 23 | 1.47 | .2048 |
| 24 | 2.25 | .1299 |
| 25 | 1.47 | .1930 |
| 26 | 2.25 | .1146 |
| 27 | 1.47 | .1931 |
| 28 | 2.25 | .1124 |
| 29 | 1.47 | .3161 |

Each of the FIGS. 2, 3, and 4 filters is designed to be useful as a sunglass lens that will have a selected aesthetic appearance (in reflected light) to persons observing the wearer of the sunglasses. Where the inventive filters are to be used as sunglasses, the substrate glass should be selected to be absorptive of ultra-violet (UV) electromagnetic radiation and to be partially absorptive of the visible wavelength band.

Figure 6:
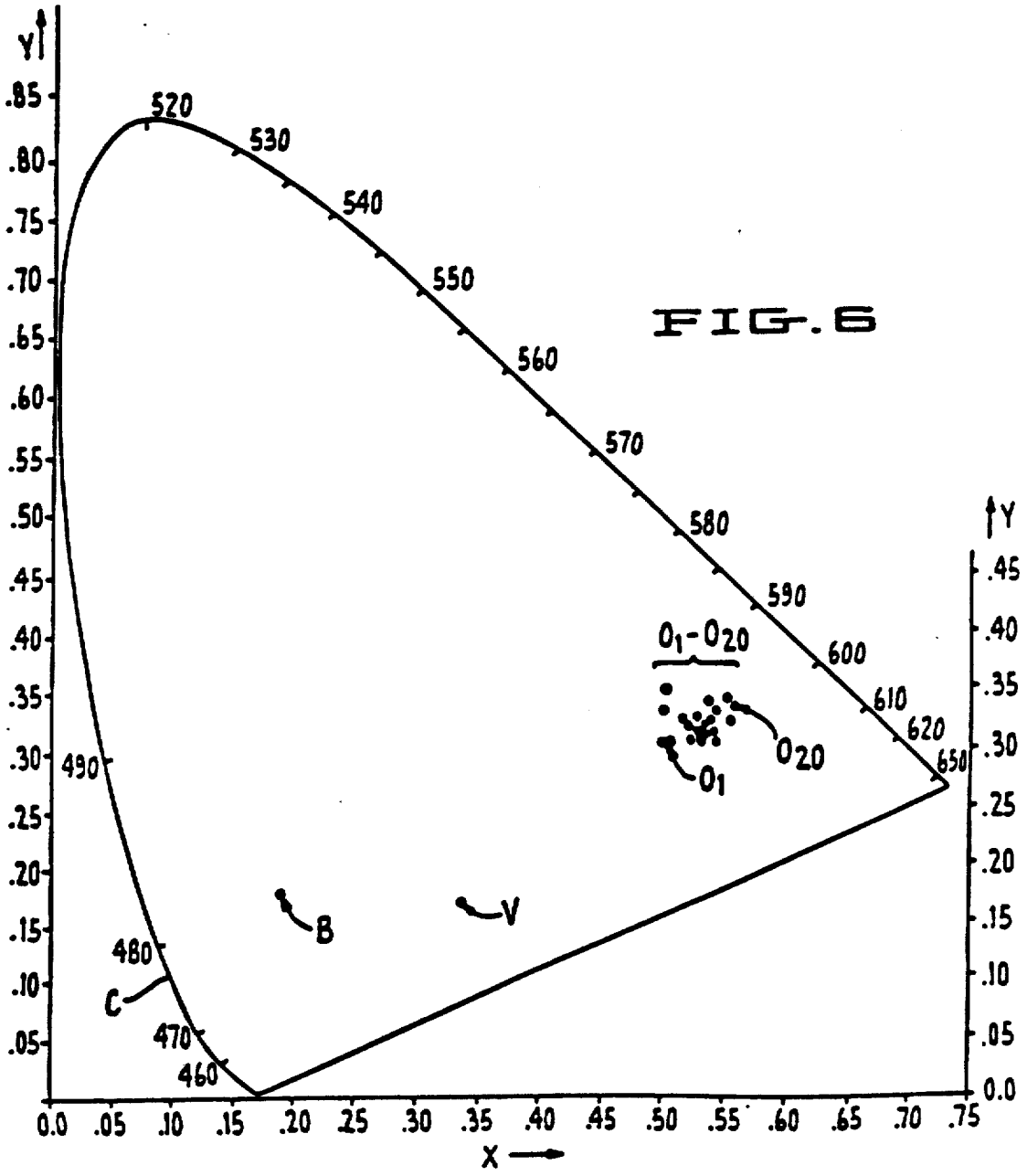
FIG. 6 is a reflection chromaticity plot (having International Committee on Illumination format) showing the chromaticity of twenty-two filters embodying the invention. Twenty of the filters are of the type reflecting orange light, one of the filters is of the type reflecting violet light, and the remaining filter is of the type reflecting blue light.

The reflection chromaticity of each of twenty-two filters embodying the invention, is indicated in FIG. 6. FIG. 6 is a chromaticity diagram having International Committee on Illumination (ICI) format, so that the X primary is plotted on the horizontal axis, the Y primary is plotted on the vertical axis, and the Z primary is uniquely determined as $Z=1-X-Y$. The numerals on curve C correspond to wavelengths in nanometers.

Data point V is the reflection chromaticity of the FIG. 2 violet embodiment, and data point B is the reflection chromaticity of the FIG. 4 blue embodiment. Points $0_1$–$0_{20}$ are computed reflection chromaticities of twenty "orange" filters assuming the filters are manufactured according to the FIG. 3 design, with a 2.22 percent manufacturing tolerance on the wavelength centering of the design, and with manufacturing tolerances (of not more than 3 percent) on each of the thicknesses of the filter's layers. Point $0_1$ corresponds to a centered wavelength 2.22 percent longer than does point $0_{20}$. The twenty clustered points thus represent twenty statistical variations of reflected color for random manufacturing tolerances on layer thickness and reflected wavelength centering. The clustered nature of points $0_1$–$0_{20}$ demonstrates the insensitivity of the FIG. 3 filter design to uncontrollable manufacturing variables.

The above description is merely illustrative of the invention. Various changes in the details of the materials, designs and methods described may be within the scope of the appended claims.

What is claimed is:

1. An optical filter, including:

a substrate having a surface, and a coating supported by the surface of the substrate, said coating including a set of alternating layers formed of material having high refractive index and substantially quarter-wave optical thickness, and material having low refractive index and substantially quarter-wave optical thickness, where the thickness of each layer is selected so that the filter has a reflectance spectrum exhibiting a ripple over a first segment of the visible spectrum but exhibiting no significant ripple over a second segment of the visible spectrum, so that the reflected light having wavelength within the first segment is sufficient to give the filter a desired aesthetic color, and where the thickness of each layer is selected so that the filter reflects substantially all electromagnetic radiation having wavelengths in the near-infrared range.

2. The filter of claim 1, wherein the substrate is composed of material that is capable of absorbing ultra-violet electromagnetic radiation.

3. The filter of claim 2, wherein the substrate is composed of material that is partially absorptive of visible electromagnetic radiation.

4. The filter of claim 1, wherein the first segment lies in the blue portion of the visible spectrum, so that the filter reflects light having a blue appearance.

5. The filter of claim 1, wherein the reflectance spectrum also exhibits a ripple over a third segment of the visible spectrum, so that the reflections corresponding to both ripples combine to give the filter a desired aesthetic color.

6. The filter of claim 5, wherein the first segment lies in the red portion of the visible spectrum and the third segment lies in the violet portion of the visible spectrum, so that the filter reflects light having a violet appearance.

7. The filter of claim 5, wherein the first segment lies in the yellow portion of the visible spectrum and the third segment lies in the red portion of the visible spectrum, so that the filter reflects light having an orange appearance.

8. The filter of claim 1, wherein the substrate is composed of glass having refractive index substantially equal to 1.52 and capable of absorbing ultra-violet radiation, and the coating is composed of layers of $SiO_2$ having refractive index substantially equal to 1.47 alternating with layers of material having refractive index substantially equal to 2.25 selected from the class of materials consisting of $TiO_2$, TiO and $Ti_2O_3$.

9. A sunglass lens, including:

(a) a substrate that is absorptive of ultraviolet electromagnetic radiation and is partially absorptive of visible radiation, said substrate having a surface and a first refractive index; and (b) a coating on the substrate's surface including layers of material having a high refractive index and substantially quarter-wave optical thickness alternating with layers of material having low refractive index and substantially quarter-wave optical thickness, the thickness of each layer being selected so that the lens has a reflectance spectrum with a ripple over a first segment in the visible range but has no significant ripple in a second segment in the visible range, so that reflected light having wavelength within the first segment is sufficient to give the lens a desired aesthetic color, and the thickness of each layer being selected so that the lens reflects substantially all electromagnetic radiation having wavelengths in the near-infrared range.

10. The lens of claim 9, wherein the layers having high refractive index all have refractive index substantially equal to a second refractive index, and the layers having low refractive index all have refractive index substantially equal to a third refractive index.

11. The lens of claim 10, wherein the substrate is formed of glass, the first refractive index is substantially equal to 1.52, the layers having said second refractive index are formed of material selected from the class of material consisting of $TiO_2$, TiO and $Ti_2O_3$, and the layers having said third refractive index are formed of $SiO_2$.

12. The less of claim 9, wherein the first segment is in the blue portion of the visible range, so that light reflected from the lens has a blue appearance.

13. The lens of claim 9, wherein the reflectance spectrum also has a ripple over the third segment in the visible range, so that the reflections corresponding to both ripples combine to give the filter a desired aesthetic color.

14. The lens of claim 13, wherein the first segment is in the yellow portion of the visible range and the third segment is in the red portion of the visible spectrum, so that light reflected from the lens has an orange appearance.

15. The lens of claim 13, wherein the first segment is in the red portion of the visible spectrum and the third segment is in the violet portion of the visible spectrum, so that light reflected from the lens has a violet appearance.

16. An optical filter, including:

(a) a substrate having a surface and a refractive index; and (b) a double quarter-wave stack coated on the substrate's surface and capable of reflecting substantially all electromagnetic radiation in the near-infrared range, said stack including a number of alternating layers characterized by refractive index and a substantially quarter-wave optical thickness is selected as a result of an iterative optimizing process so that the filter's reflectance spectrum has at least one rippled segment in the visible spectrum and at least one non-rippled segment in the visible range.

17. The filter of claim 16, wherein the substrate is composed of material transparent to ultra-violet radiation and visible radiation.

18. The filter of claim 16, wherein the substrate is composed of material absorptive of ultra-violet radiation.

19. The filter of claim 16, wherein the substrate is composed of material partially absorptive of visible radiation.

20. The filter of claim 16, wherein the double quarter-wave stack consists of layers of $SiO_2$ alternating with layers of material selected from the class of materials consisting of $TiO_2$, TiO and $Ti_2O_3$.

21. The filter of claim 16, wherein the double quarter-wave stack consists of twenty-nine layers with increasing layer number corresponding to increasing departure from the substrate, and each layer has refractive index and physical thickness substantially as follows:

| Layer Number | Refractive Index | Physical Thickness (micrometers) |
|---|---|---|
| 1 | 1.47 | .0122 |
| 2 | 2.25 | .1134 |
| 3 | 1.47 | .1757 |
| 4 | 2.25 | .1089 |
| 5 | 1.47 | .1531 |
| 6 | 2.25 | .1047 |
| 7 | 1.47 | .1623 |
| 8 | 2.25 | .1024 |
| 9 | 1.47 | .1590 |
| 10 | 2.25 | .1044 |
| 11 | 1.47 | .1545 |
| 12 | 2.25 | .1073 |
| 13 | 1.47 | .1544 |
| 14 | 2.25 | .1086 |
| 15 | 1.47 | .1590 |
| 16 | 2.25 | .1103 |
| 17 | 1.47 | .1691 |
| 18 | 2.25 | .1210 |
| 19 | 1.47 | .1899 |
| 20 | 2.25 | .1249 |
| 21 | 1.47 | .2018 |
| 22 | 2.25 | .1177 |
| 23 | 1.47 | .2048 |
| 24 | 2.25 | .1299 |
| 25 | 1.47 | .1930 |
| 26 | 2.25 | .1146 |
| 27 | 1.47 | .1931 |
| 28 | 2.25 | .1124 |
| 29 | 1.47 | .3161 |

22. The filter of claim 16, wherein the stack consists of twenty-nine layers, with increasing layer number corresponding to increasing departure from the substrate, and each layer has refractive index and physical thickness substantially as follows:

| Layer Number | Refractive Index | Physical Thickness (micrometers) |
|---|---|---|
| 1 | 1.47 | .0122 |
| 2 | 2.25 | .0922 |
| 3 | 1.47 | .1440 |
| 4 | 2.25 | .0778 |
| 5 | 1.47 | .1393 |
| 6 | 2.25 | .0823 |
| 7 | 1.47 | .1461 |
| 8 | 2.25 | .0859 |
| 9 | 1.47 | .1431 |
| 10 | 2.25 | .0861 |
| 11 | 1.47 | .1425 |
| 12 | 2.25 | .0862 |
| 13 | 1.47 | .1444 |
| 14 | 2.25 | .0834 |
| 15 | 1.47 | .1454 |
| 16 | 2.25 | .0827 |
| 17 | 1.47 | .1585 |
| 18 | 2.25 | .1055 |
| 19 | 1.47 | .1792 |
| 20 | 2.25 | .1074 |
| 21 | 1.47 | .1798 |
| 22 | 2.25 | .1102 |
| 23 | 1.47 | .1790 |
| 24 | 2.25 | .1111 |
| 25 | 1.47 | .1770 |
| 26 | 2.25 | .1102 |
| 27 | 1.47 | .1782 |
| 28 | 2.25 | .1026 |
| 29 | 1.47 | .2427 |

23. The filter of claim 16, wherein the stack consists of thirty layers, with increasing layer number corresponding to increasing departure from the substrate, and each layer has refractive index and physical thickness substantially as follows:

| Layer Number | Refractive Index | Physical Thickness (micrometers) |
|---|---|---|
| 1 | 2.25 | .1058 |
| 2 | 1.47 | .1597 |
| 3 | 2.25 | .0929 |
| 4 | 1.47 | .1531 |
| 5 | 2.25 | .0844 |
| 6 | 1.47 | .1496 |
| 7 | 2.25 | .0794 |
| 8 | 1.47 | .1480 |
| 9 | 2.25 | .0847 |
| 10 | 1.47 | .1505 |
| 11 | 2.25 | .0858 |
| 12 | 1.47 | .1493 |
| 13 | 2.25 | .0823 |
| 14 | 1.47 | .1475 |
| 15 | 2.25 | .0882 |
| 16 | 1.47 | .1669 |
| 17 | 2.25 | .1135 |
| 18 | 1.47 | .1898 |
| 19 | 2.25 | .1121 |
| 20 | 1.47 | .1827 |
| 21 | 2.25 | .1178 |
| 22 | 1.47 | .1914 |
| 23 | 2.25 | .1120 |
| 24 | 1.47 | .1806 |
| 25 | 2.25 | .1128 |
| 26 | 1.47 | .1856 |
| 27 | 2.25 | .1162 |
| 28 | 1.47 | .1788 |
| 29 | 2.25 | .1039 |
| 30 | 1.47 | .2638 |

*24. An optical filter comprising:*

*a substrate having a surface; and*

*a coating supported by the surface of the substrate, the coating including a set of alternating layers of material having a high refractive index and substantially*

*quarter-wave optical thickness and of material having a low refractive index and substantially quarter-wave optical thickness, where the thickness of each of the layers is selected so that the filter has a reflectance spectrum exhibiting a ripple over at least one segment of the visible portion of the spectrum while exhibiting no significant ripple over another segment of the visible portion of the spectrum so that a desired aesthetic color is produced substantially exclusively by reflected light in the at least one segment of the visible portion of the spectrum and further selected so that the combination of the substrate and the coating function to block substantially all of the light in the near-infrared portion of the spectrum.*

*25. The optical filter of claim 24 wherein the substrate is comprised of material which absorbs ultra-violet electromagnetic radiation so that the filter also blocks light in the ultra-violet portion of the spectrum.*

*26. The filter of claim 25 wherein the at least one segment includes a first segment which lies in the blue portion of the visible spectrum so that the desired aesthetic color is blue.*

*27. The filter of claim 25 wherein the at least one segment includes first and second separate segments of the visible spectrum so that the desired aesthetic color is produced by the combination of the light reflected in the first and second segments.*

*28. The filter of claim 25 wherein the first and second segments lie in the red and violet portions of the visible spectrum, respectively so that the desired aesthetic color is violet.*

*29. The filter of claim 25 wherein the first and second segments lie in the yellow and red portions of the visible spectrum, respectively, so that the desired aesthetic color is orange.*

*30. The filter of claim 25 wherein the substrate is comprised of glass having a refractive index substantially equal to 1.52 and capable of absorbing ultra-violet radiation and the coating is comprised of layers of $SiO_2$ having refractive index substantially equal to 1.47 alternating with layers of material having refractive index substantially equal to 2.25 selected from the class of materials consisting of $TiO_2$, $TiO$ and $Ti_2O_3$.*

*31. The filter of claim 24 wherein the thickness of each layer is selected so that substantially all electromagnetic radiation having wavelengths in the near-infrared range is reflected.*

*32. The filter of claim 31 wherein the substrate is comprised of material partially absorptive of visible electromagnetic radiation.*

* * * * *

UNITED STATES PATENT AND TRADEMARK OFFICE

CERTIFICATE OF CORRECTION

PATENT NO. : Re. 33,729

DATED : October 29, 1991

INVENTOR(S) : Bruce E. Perilloux

It is certified that error appears in the above - identified patent and that said Letters Patent is hereby corrected as shown below:

Column 3, line 2, change "$TiO_2$, Ti" to --$TiO_2$, TiO--;

Column 5, lines 52-53, change "extinction coefficients" to --total transmittance--;

Column 5, line 57, change "Extinction Coefficient" to --Total Transmittance--; and Column 6, line 1, change "extinction coefficients are" to --total transmittance is--.

Signed and Sealed this

Fourteenth Day of September, 1993

Bruce Lehman

*Attest:*

BRUCE LEHMAN

*Attesting Officer*

*Commissioner of Patents and Trademarks*